(No Model.)
T. E. WELLS.
HOSE COUPLING.
No. 296,093. Patented Apr. 1, 1884.
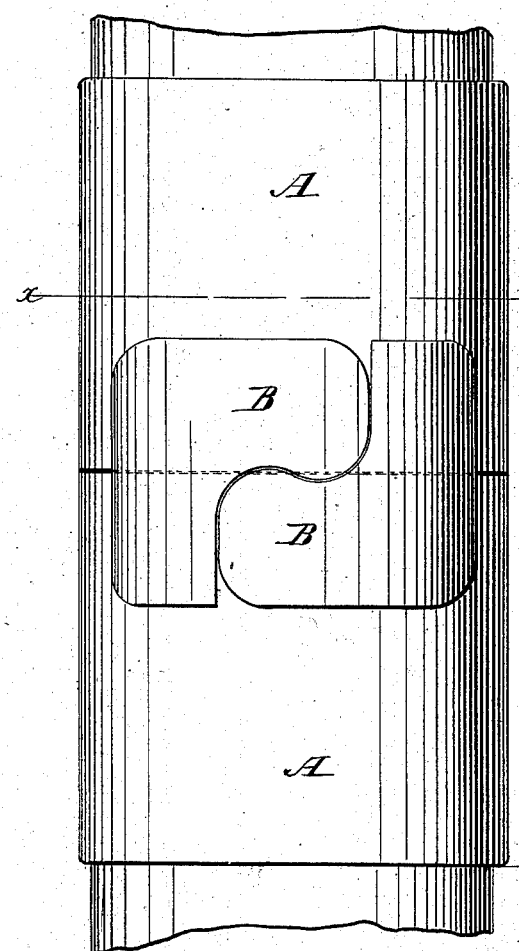
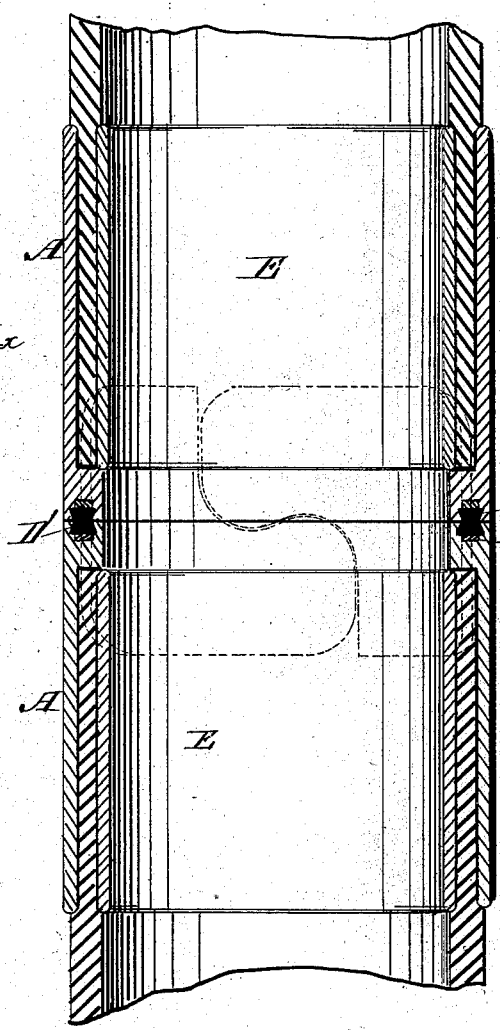
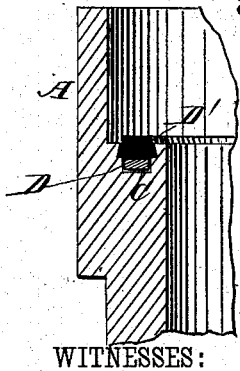
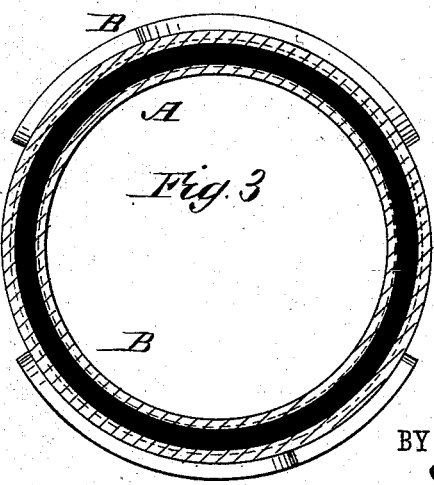
WITNESSES:
F. McArdle
C. Sedgwick
INVENTOR:
T. E. Wells
BY Munn & Co
ATTORNEYS.

UNITED STATES PATENT OFFICE.

THOMAS E. WELLS, OF SANDY HILL, NEW YORK.

HOSE-COUPLING.

SPECIFICATION forming part of Letters Patent No. 296,093, dated April 1, 1884.

Application filed May 3, 1883. (No model.)

*To all whom it may concern:*

Be it known that I, THOMAS E. WELLS, of Sandy Hill, in the county of Washington and State of New York, have invented a new and Improved Hose-Coupling, of which the following is a full, clear, and exact description.

The object of my invention is to provide a new and improved device for coupling hose easily and rapidly.

The invention consists in two pieces of tubing or rings provided with hook-prongs projecting beyond the edges of the said rings, which rings have annular grooves in the outer edges, into which grooves packing-rings are placed. The ends of the rings or pieces of tubing are placed against each other and turned until the edges of the hooks are in contact.

Reference is to be had to the accompanying drawings, forming part of this specification, in which similar letters of reference indicate corresponding parts in all the figures.

Figure 1 is a longitudinal elevation of my improved hose-coupling. Fig. 2 is a longitudinal sectional elevation of the same. Fig. 3 is a cross-sectional view of the same on the line $x$ $x$, Fig. 1. Fig. 4 is a detail vertical sectional view of a modification of the joint.

A collar or piece of tubing, A, is attached to the end of each hose, and to the outer surface of each piece of tubing A two hook-prongs, B, are secured opposite each other, which project beyond the end of the piece of tubing. The hook-prongs are all of the same shape, so that their edges will fit very closely against each other. The prongs B have a compound curve formed in their lower edge, so that when locked together they cannot come apart easily, but are held by the said curve. A metal ring, E, is held in each end of the hose, so that the end of the hose may be held between the said ring E and the collar or piece of tubing A. Each piece of tubing A is provided in its end edge with an annular groove, C, into each of which grooves a metal ring, D, is placed, on which a packing-ring, D', of rubber or leather, is placed.

The object of using the metallic rings D under the rubber packing D' is to facilitate the slip which is required in coupling two sections of hose together. There must be a slip in the packing-rings, and without the metallic rings it will not easily occur.

To couple the hose, the ends of the two pieces of tubing are brought in contact, and are turned until the edges of the hook-prongs rest against each other, as shown in Fig. 1, thereby holding the two pieces of tubing together and coupling them.

Having thus described my invention, what I claim as new, and desire to secure by Letters Patent, is—

The combination, with hose-sections, of the collar A, having hook-prongs B, projecting beyond the end, and annular groove C, the metallic rings D E, and the packing-ring D', as and for the purpose specified.

THOMAS E. WELLS.

Witnesses:
 HARRY E. TIDMARSH,
 WILLIAM W. WELLS.